United States Patent [19]

Briggs et al.

[11] Patent Number: 5,439,199
[45] Date of Patent: Aug. 8, 1995

[54] WATER BALLOON FILLING VALVE

[75] Inventors: Michael Briggs; Gerald A. Lowe; Rick C. Geething, all of Ashland; Patrick Wagonfield, Hamilton; John S. Zach, Cleveland, all of Ohio

[73] Assignee: The National Latex Products Company, Ashland, Ohio

[21] Appl. No.: 170,582

[22] Filed: Dec. 20, 1993

[51] Int. Cl.6 .............................................. F16K 3/24
[52] U.S. Cl. ..................................... 251/320; 251/324
[58] Field of Search ............... 251/324, 320; 137/906, 137/223

[56] References Cited

U.S. PATENT DOCUMENTS

| | | | |
|---|---|---|---|
| 1,209,213 | 12/1916 | Schneider | 137/223 |
| 1,493,121 | 5/1924 | McAneny . | |
| 1,722,103 | 7/1929 | McFarlan | 251/320 |
| 1,743,758 | 1/1930 | Cobb | 251/320 X |
| 2,217,050 | 10/1940 | Groves . | |
| 2,654,562 | 10/1953 | Foster | 251/324 X |
| 2,946,485 | 7/1960 | Durner | 251/324 X |
| 2,960,122 | 11/1960 | Fuller . | |
| 3,368,302 | 2/1968 | Martino | 137/223 X |
| 4,134,573 | 1/1979 | Messinger | 251/324 X |
| 4,243,220 | 1/1981 | Shelley . | |
| 4,550,861 | 11/1985 | Fay, Sr. et al. | 251/320 X |
| 4,848,600 | 7/1989 | Dark . | |
| 4,887,633 | 12/1989 | Taylor, Jr. . | |
| 5,064,168 | 11/1991 | Raines et al. | 251/324 X |

FOREIGN PATENT DOCUMENTS 135743  8/1948  Australia .............................. 137/320

Primary Examiner—John Rivell
Attorney, Agent, or Firm—Oldham, Oldham, & Wilson Co.

[57] ABSTRACT

A valve selectively dispenses noncompressible fluid from a pressurized source into a receptacle. The valve has a body with a valve spool slidingly retained in a hollow cylinder in the body. The ends of the body are communicated by an internal channel, the first end adapted to engage the source and the second end adapted to engage the receptacle. The hollow cylinder is an intermediate part of the internal channel. The valve spool has first and second enlarged portions that effectively divide the hollow cylinder into first and second noncommunicated chambers. When the valve spool is in a closed position, the first end is communicated only with the first chamber and the pressure of the fluid in the first chamber provides an outward biasing force on the valve spool, keeping it in the closed position. When the valve spool is moved to an open position by application of an external force on the valve spool overcoming the outward biasing force, the first end is communicated with both the first chamber and the second chamber, which has a link with the second end, allowing fluid flow through the valve. Release of the external applied force allows the pressure of the fluid in the first chamber to restore the valve spool to the closed position. The valve spool is retained in the cylinder by a pin seated in an aperture in the first end such that an end of the pin extends into the cylinder, or a collar fitted around the valve spool near the end.

5 Claims, 2 Drawing Sheets

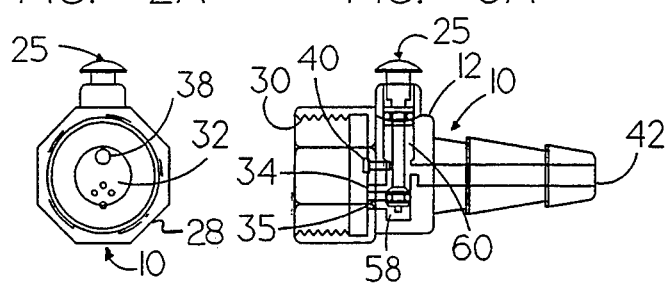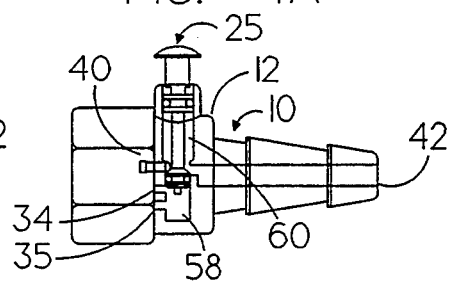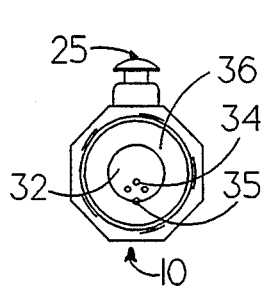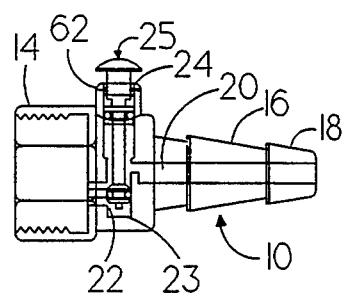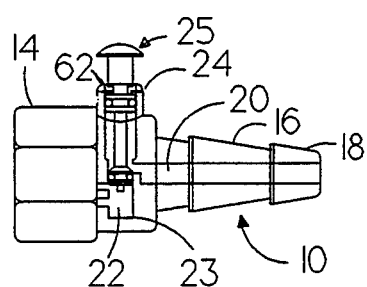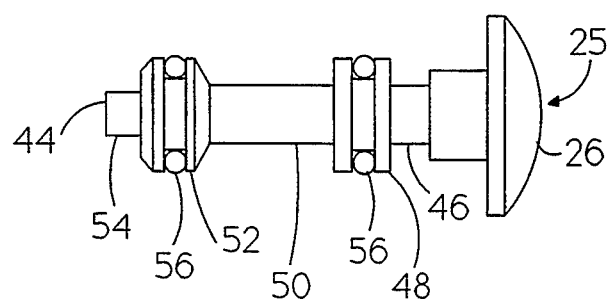

WATER BALLOON FILLING VALVE

The present invention relates to a valve for filling a water balloon or similar device with a non-compressible fluid such as water. More particularly, the present invention relates to a valve for filling a water balloon wherein the valve provides a positive shut-off for a pressurized fluid source unless a valve spool on the valve is actively being depressed by the user, allowing the non-compressible fluid to flow through the valve and into the water balloon.

BACKGROUND ART

Water balloons and similar toys are well known. When a balloon is filled with air by child or other user, the process is not inherently messy. But when the same child wants to fill the balloon with water or similar noncompressible fluid material (water being by far the material of choice), the process is certainly inherently messy. If the filling neck of the balloon needs be stretched over a hose fitting or the like, it is likely that the neck will tear. Even if it does not tear, the very act of removing the balloon neck from the hose fitting or spigot can be quite sloppy. Since the device is to be used largely by children, the device must be easy to operate, easy and inexpensive to produce, and inexpensive.

U.S. Pat. 4,848,600 to Dark in July 1989 discloses a self closing dispensing valve for dispensing fluid. The advantage taught by Dark is the capability to form his novitious valve structure in a one-piece molding operation, where no metal spring is needed to provide the restorative force. However, Dark uses a plastic leaf-type spring to close the valve. The application taught by Dark involves the use of his valve device with beverage containers, where the fluid pressure is essentially static rather than dynamic, as is available with a spigot or hose. While Dark teaches some of the need for the present invention and the unsolved nature of the present invention, it does not teach a valve device where the restorative force in the valve device is provided by the noncompressibility of the fluid.

SUMMARY OF THE INVENTION

A first object of the invention is to provide a valve device to dispense an essentially noncompressible fluid from a pressurized source into a receptacle such that the valve will allow fluid flow when an activation button is depressed by a user, but that will use the property of noncompressibility of the fluid to close the valve when the user no longer depresses the activation button.

A further object of the present invention is to provide such a valve device wherein the entire valve device is easily manufactured from thermoplastic materials.

These and other objects of the present invention are achieved by a valve device with a body portion, a valve spool and a means for retaining the valve spool in the body portion. The body portion has a first end and a second end, the ends being communicated by an internal channel. The first end is adapted to engage the pressurized source of fluid and the second end is adapted to engage the receptacle, such as a water balloon. The internal channel has an intermediate portion comprising a hollow cylinder with a valve spool slidingly engaged in the hollow cylinder. The valve spool is held in the cylinder by the retaining means. The valve spool has first and second enlarged portions that effectively divide the hollow cylinder into first and second chambers, which are not communicated to each other, so that no fluid flows from one chamber to the other. The internal channel further has a first and second passages communicating the hollow cylinder with the first end and a third passage communicating the hollow cylinder with the second end. When the valve spool is in a first closed position, the first and second passages communicate with the first chamber and the third passage communicates with the second chamber, so that no fluid flows through the valve device and the pressure of the essentially noncompressible fluid in the first chamber provides an outward biasing force on the valve spool holding the valve device in the closed position. When the valve spool is moved inwardly into the hollow cylinder to a second open position by application of an external force on the valve spool overcoming the outward biasing force, the first passage still communicates with the first chamber, but the second passage communicates with the second chamber, as does the third passage, the communication of the second and third passages to the second chamber forming the internal channel and allowing fluid flow through the valve. When the external applied force is released, the pressure of the fluid in the first chamber restores the valve spool to the closed first position. One means for retaining the valve spool in the cylinder comprises a pin seated in an aperture in the first end such that an end of the pin extends into the cylinder sufficiently to block movement of the first enlarged portion past the pin. Another means for retaining the valve spool in the cylinder comprises a collar fired around the valve spool near an end thereof, the collar being securely fastened to the body portion, such that the collar obstructs movement of the second enlarged portion past the collar.

BRIEF DESCRIPTION OF THE DRAWINGS

Better understanding of the present invention will be obtained when reference is made to the accompanying drawings, which are made apart hereof, in which identical parts are indicated by identical pan numbers, and in which:

FIG. 2A shows a top plan view of a first embodiment of the present invention;

FIG. 2B shows a top plan view of a second embodiment of the present invention

FIG. 3A shows a side sectional view of the first embodiment with the valve spool positioned so that the valve is in a first open position;

FIG. 3B shows a side sectional view of the second embodiment with the valve spool positioned so that the valve is in a first open position;

FIG. 4A shows aside sectional view of the first embodiment with the valve spool positioned so that the valve is in a second closed position;

FIG. 4B shows aside sectional view of the second embodiment with the valve spool positioned so that the valve is in a second closed position; and FIG. 5 shows a plan view of the valve spool of the present invention.

DETAILED DESCRIPTION OF THE DRAWINGS

Figure 1:
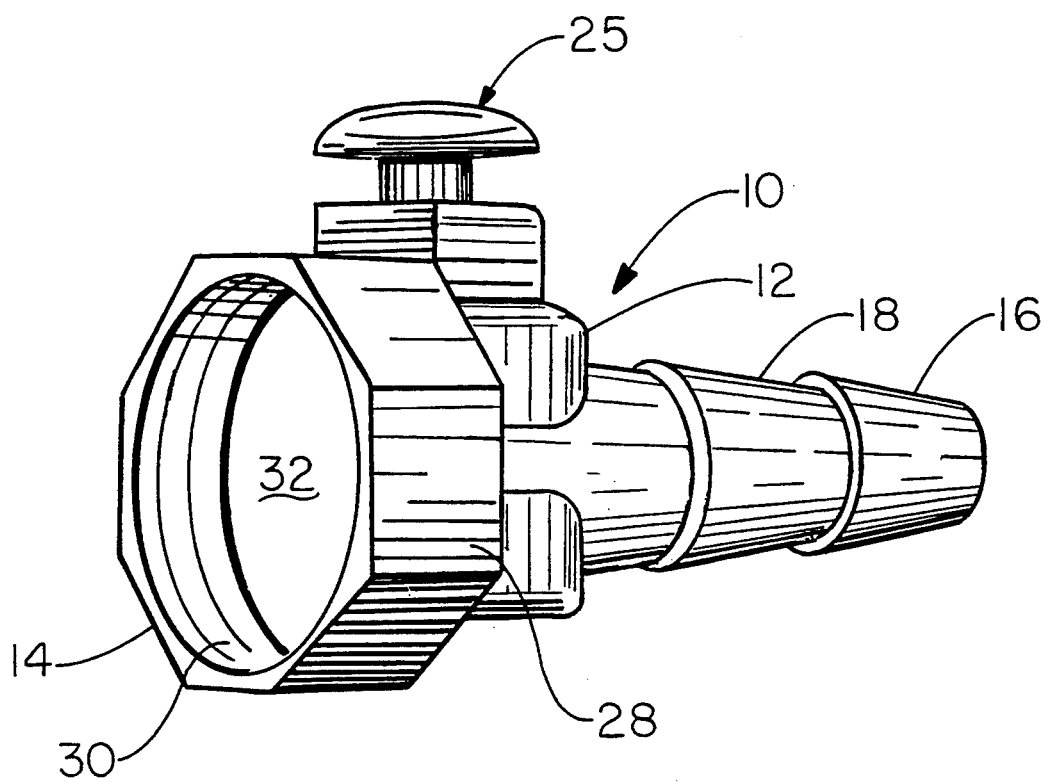
FIG. 1 depicts a perspective view of the present invention.

The device 10 of the present invention is shown in perspective view in FIG. 1. The device 10 comprises a body portion 12 that has a first end 14 and a second end 16. The first end 12 is adapted to threadingly engage a male hose fitting or spigot. In the preferred embodiment, this threading engagement is achieved by placing female threading on the inside surface of the first end. The second end 16 is adapted to frictionally engage the filling opening of a balloon or similar device. The preferred frictional engagement is achieved by a nipple portion in which the diameter of the second end 16 is discontinuously increased by a series of essentially frustoconical sections 18.

Between the first end 14 and the second end 16, an internal channel 20 (described further below) communicates the first end to the second end. This internal channel 20 runs generally parallel with the longitudinal axis of the body portion 12. The internal channel 20 has a transverse channel 22 intersecting it. This transverse channel 22, which has a closed end 23 and an open end 24, is fitted with a valve spool 25 (also described further below), which may be positioned in the open end of the transverse channel such that the a first end 26 of the valve spool extends outwardly from the body portion 12, essentially radially to the longitudinal axis thereof. This first end 26 serves as a means for the user to open the valve device 10 by depressing the first end 26 into the body portion 12. As will be described further below, the first end 26 of the valve spool 25 will be biased outwardly by fluid pressure in the body portion 12 when the first end 14 of the device 10 is communicated to a source of pressurized non-compressible fluid, such as water and no eternally-applied force is depressing the first end 26. In this condition, the valve spool 25 interrupts communication of the first end 14 with the second end 16, and no fluid can flow from the first end to the second end. When the first end 26 of the valve spool 25 is depressed into the body portion 12 by the user, the internal features of the valve spool 25 do not interrupt the communication, and fluid flows through the device 10 from the first end 14 to the second end 16.

Further attention is now directed to the first end 14 of the device 10, as shown in FIGS. 2A and 2B, where FIG. 2A shows the first end of a first embodiment of the invention and FIG. 2B shows a second embodiment. The outer surface 28 of the first end 14 preferably has a polygonal cross-section, such as the octagonal shape shown in the FIGURE. This preferred shape facilitates the use of a tool such as a wrench for attaching or detaching the device 10 to a water source, such as a male spigot or a male hose fastener. As mentioned above, the inside surface 30 is preferably circular and equipped with female threading to accept the male fitting. The inner threading goes about ¾ inch deep into the first end 14, at which point a flat base surface 32 is encountered, effectively forming a chamber at the first end 14 with the inner surface 30. Bored into the base surface 32 and penetrating through to the underlying transverse channel 22 are at least two passages, 34 and 35. Passages 34 and 35 are preferably perpendicularly radial to the longitudinal axis of the transverse axis of the transverse channel 22. Of the passages 34 and 35, hole 35 is positioned closer to the closed end 23 of the transverse channel 22 and hole 34 is positioned closer to the open end 24 of the transverse channel. An elastomeric washer 36 or similar fitting may be placed in the first end 14 against the base surface 32 to allow a good seal to be formed between the inner surface 30 and the male fitting, although this washer 36 is not critical to the operation of the device so long as a good seal is obtained between the male fitting and the female threading. In a first embodiment of the present invention, as shown in FIG. 2A, a further passage 38 is bored in the base surface 32 and communicates the first end 14 with the transverse channel 22. As described below, this passage 38 provides an aperture for inserting a retaining pin 40 to hold the valve spool 25 in the transverse channel 22. FIG. 2B does not show this passage 38, since no pin 40 is used in that embodiment to retain the valve spool 25 in the channel 22. In fact, it is this difference in how the valve spool is retained that distinguishes the first and second embodiments.

Attention is now directed to the second end 16 of the body portion 12, particularly as illustrated in FIGS. 3A and 3B. The outer surface of the second end 16 has been described above. Concentric with the circular second end 16 and terminating in the transverse channel 22 is a passage 42. Passing from the first end 14 to the second end 16, then, internal channel 20 is formed by the communicated passages 34 and 35, transverse channel 22 and passage 42. As shown in the FIGURES, neither passage 34 nor 35 is aligned coaxially with passage 42 in their respective connections into transverse channel 22. This non-alignment allows the valve spool 25 of the present invention to be operative.

The valve spool 25 of the present invention is shown operatively engaged in the two embodiments of the invention in FIGS. 3A through 4B, and is shown in isolation in FIG. 5. The valve spool 25 has already been described as having a first end 26, which is enlarged to serve as a button for depressing the valve spool inwardly into the transverse channel 22. At the opposite end of the valve spool 25 is a second end 44. Moving from the first end 26 of the valve spool 25 to the second end 44, the valve spool comprises a first narrow portion 46, a first enlarged portion 48, a second narrow portion 50, a second enlarged portion 52 and a third narrow portion 54 terminating in the second end 44. Of these sections, the first and second enlarged portions 48 and 52 are each fitted with an "0" ring 56 or similar fitting so that a sliding engagement is formed with the inner surface of the transverse channel 22 when the valve spool 25 if positioned in the transverse channel. Because the sliding engagement formed by the "0" rings 56 with the transverse channel 22 does not permit any significant amount of fluid flow past the "0" rings, the placement of the valve spool 25 into the transverse channel effectively divides the transverse channel into a pair of chambers 58 and 60. Of these, the first chamber 58 is defined by the closed end 23 and inner surface of the transverse channel 22 and second enlarged portion 52 of the valve spool 25; the second chamber 60 is defined by the first enlarged portion 48 and the second enlarged portion of the valve spool and the inner surface of the transverse channel.

When valve spool 25 is seated in the transverse channel 22 and depressed by a user, as shown in either FIG. 3A and 3B (FIG. 3A showing the first embodiment and FIG. 3B showing the second embodiment), pressurized non-compressible fluid from the fluid source attached to the first end 14 of device 10 may enter first chamber 58 through entry passage 35, but first chamber 58 has no exits, since the second enlarged portion 52 lies between entry passage 34 and entry passage 35. Fluid may enter second chamber 60 through entry passage 34. Since exit passage 42 is communicated to second chamber 60 and forms an exit thereto, fluid flows through the second chamber and entry passage 34, second chamber 60 and exit passage 42 effectively connect first end 14 to second end 16. If the user stops actively applying force to the first end 26 of the valve spool 25, the non-compressible fluid entering the first chamber 58 will act against second enlarged portion 52, urging it outwardly. This movement is dictated by the well-known Bernoulli effect, due to the lower pressure existing in the second chamber 60 than in the first chamber 58. As this movement of the valve spool 25 occurs, entry passages 34 and 35 will each be communicated with the first chamber 58, which will still have no exit. Second chamber 60, on the other hand, will still be communicated with exit passage 42, but will lose the fluid entry through entry passage 34. As this occurs, the internal channel 20 is interrupted and fluid flow from the first end 14 to the second end 16 ceases. If nothing else acted on valve spool 25, the fluid pressure would move the valve spool out further still, communicating entry passages 34 and 35 as well as exit passage 42 to the first chamber 58, reestablishing fluid flow. However, in a first embodiment shown in FIG. 3A, the retaining pin 40 fitted into hole 38 prevents the second enlarged portion 52 from moving far enough to communicate exit passage hole 42 with the first chamber 58. In a second embodiment shown in FIG. 3B, a collar 62 seated at the open end 24 of the transverse channel 22 stops outward movement of the first enlarged portion 48 before the second enlarged portion 52 can move far enough to communicate exit passage 42 with the first chamber 58. Such a collar 60 is preferably applied as a split collar of a thermoplastic material that is cemented in place by an adhesive. Likewise, retaining pin 40 would typically be cemented into its position in passage 38. In this manner, the device 10 uses the pressure and non-compressibility of the fluid being dispersed to prevent dispersal when the valve spool 22 is not being actively depressed by a user into the position shown in FIG. 4A or 4B, again depending upon the embodiment.

While the best mode and an enabling description of the present invention have been presented in the foregoing specification to comply with the requirements of the patent laws, the scope of the invention is not to be measured by the specification, but instead should be determined by the accompanying claims.

What is claimed is:

1. A valve for selectively dispensing an essentially noncompressible fluid from a pressurized source into a receptacle, said valve comprising:

a body portion having a first end and a second end, the ends communicated by an internal channel, the first end adapted to engage the source and the second end adapted to engage the receptacle;

the internal channel having an intermediate portion comprising a hollow cylinder with a valve spool slidingly engaged therein, the valve spool having first and second enlarged portions effectively dividing the hollow cylinder into a first and a second chamber, the chambers not communicated to each other, the internal channel further having a first and a second passage communicating the hollow cylinder with the first end and a third passage communicating the hollow cylinder with the second end, the valve spool being held in the cylinder by a pin seated in an aperture in the first end such that an end of the pin extends into the cylinder sufficiently to block movement of the first enlarged portion therepast;

wherein the first and second passages communicate with the first chamber and the third passage communicates with the second chamber when the valve spool is in a first closed position, the pressure of the essentially noncompressible fluid in the first chamber providing an outward biasing force on the valve spool into the closed position; and wherein the first passage communicates with the first chamber and the second and third passages communicate with the second chamber when the valve spool is moved to a second open position by application of an external force on the valve spool overcoming the outward biasing force, the communication of the second and third passages to the second chamber forming the internal channel and allowing fluid flow through the valve; and wherein release of the external applied force allows the pressure of the fluid in the first chamber to restore the valve spool to the first closed position.

2. The device of claim 1 wherein the hollow cylinder is positioned transverse to a longitudinal axis of the body portion.

3. The device of claim 1 wherein the first end of the body portion is adapted to threadingly engage a male hose fitting.

4. The device of claim 1 wherein the second end of the body portion is adapted to frictionally engage a water balloon.

5. The device of claim 4 wherein the second end of the body portion has a nipple portion comprising a series of frustoconical sections of increasing diameter.

* * * * *